United States Patent
Wheaton et al.

(10) Patent No.: US 12,523,725 B2
(45) Date of Patent: Jan. 13, 2026

(54) METHOD FOR FAST TX/RX INTENSITY CORRECTION CALIBRATION USING B1 PROJECTIONS IN MAGNETIC RESONANCE IMAGING SYSTEMS

(71) Applicant: CANON MEDICAL SYSTEMS CORPORATION, Tochigi (JP)

(72) Inventors: Andrew James Wheaton, Vernon Hills, IL (US); Yoshinori Hamamura, Vernon Hills, IL (US)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 124 days.

(21) Appl. No.: 18/461,863

(22) Filed: Sep. 6, 2023

(65) Prior Publication Data

US 2025/0076436 A1 Mar. 6, 2025

(51) Int. Cl.
*G01R 33/56* (2006.01)
*G01R 33/565* (2006.01)

(52) U.S. Cl.
CPC ....... *G01R 33/5608* (2013.01); *G01R 33/565* (2013.01)

(58) Field of Classification Search
CPC .. G01R 33/5608; G01R 33/565; A61B 5/055; A61B 5/0033
See application file for complete search history.

(56) References Cited

U.S. PATENT DOCUMENTS

| | | | |
|---|---|---|---|
| 11,009,578 B2 * | 5/2021 | Gui | G06T 5/60 |
| 2011/0293158 A1 * | 12/2011 | Popescu | G06T 11/006 382/266 |
| 2012/0032676 A1 | 2/2012 | Dannels | |
| 2013/0134972 A1 * | 5/2013 | Schulte | G01R 33/246 324/309 |
| 2016/0187438 A1 | 6/2016 | Gui et al. | |
| 2019/0378270 A1 | 12/2019 | Ida et al. | |
| 2021/0018583 A1 * | 1/2021 | Gui | G01R 33/58 |

* cited by examiner

*Primary Examiner* — Baisakhi Roy
(74) *Attorney, Agent, or Firm* — Oblon, McClelland, Maier & Neustadt, L.L.P.

(57) ABSTRACT

A method for determining an intensity-corrected magnetic resonance image includes acquiring B1 projection data of a patient using a magnetic resonance imaging system. The method also includes determining a transmit map using only the acquired B1 projection data. The method further includes acquiring an image of a patient using magnetic resonance imaging system and correcting an image intensity of the acquired image using the determined set of maps. The method also includes outputting the corrected image of the patient.

16 Claims, 6 Drawing Sheets

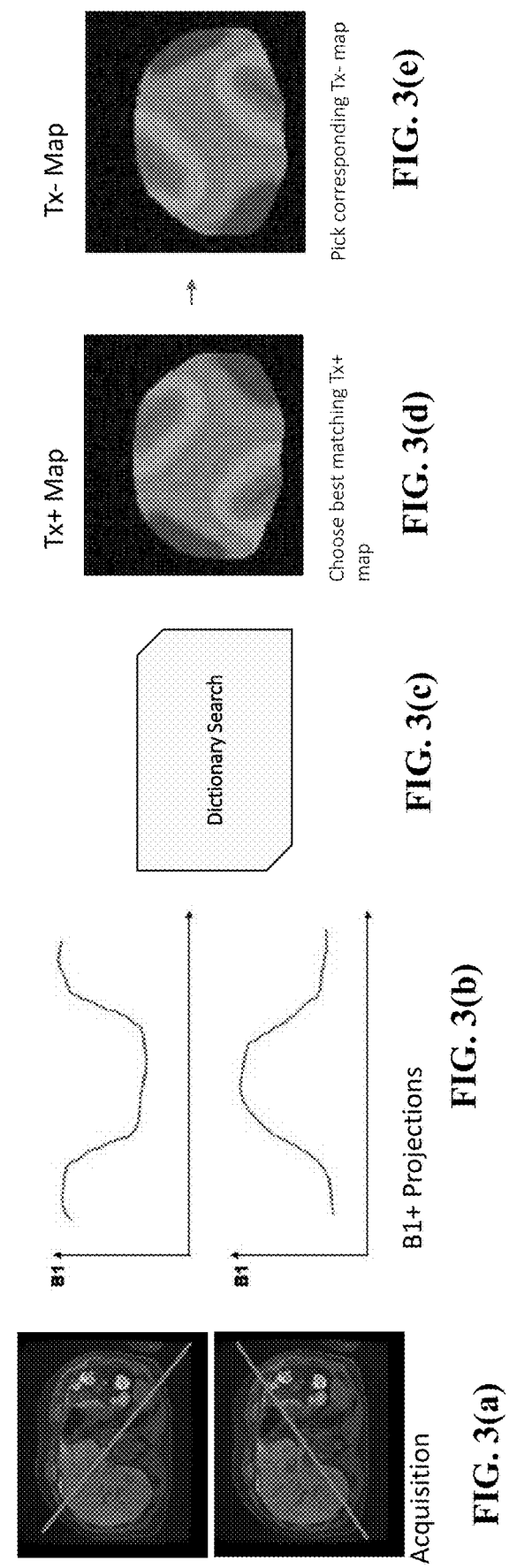

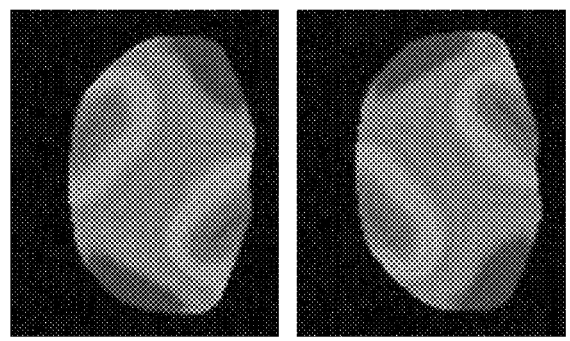
FIG. 4(d) Tx+ Map
FIG. 4(e) Tx- Map
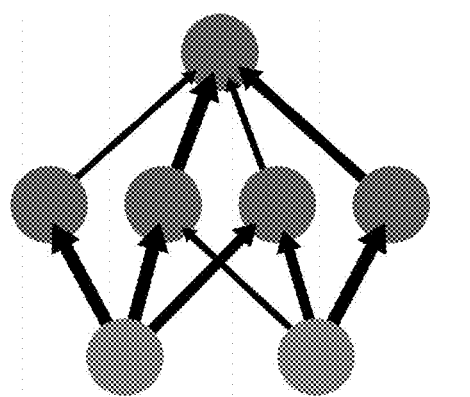
FIG. 4(c) ML Network
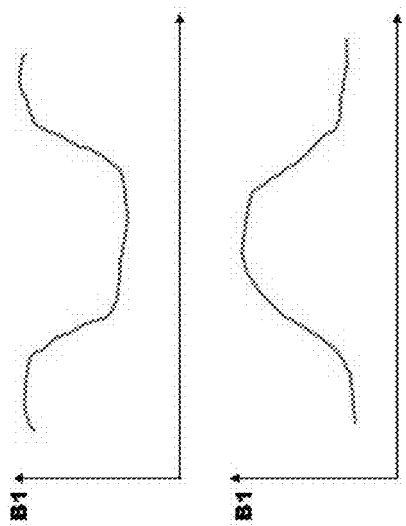
FIG. 4(b) B1+ Projections
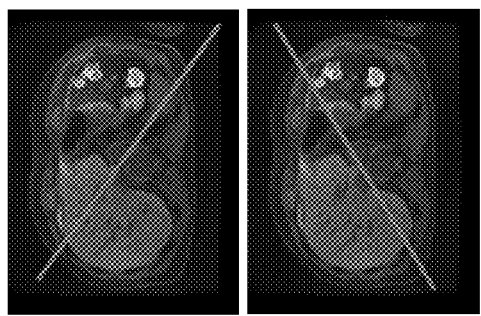
FIG. 4(a) Acquisition

METHOD FOR FAST TX/RX INTENSITY CORRECTION CALIBRATION USING B1 PROJECTIONS IN MAGNETIC RESONANCE IMAGING SYSTEMS

FIELD

The present disclosure is directed to patient-specific image intensity correction using radio frequency (RF) magnetic fields (e.g., "B1 fields") in magnetic resonance imaging (MRI) systems. The image intensity correction is performed in vivo based on projection data as a measure of the spatial distribution of the transmit field of a whole-body coil (WBC) acquired along one or more projections over a patient that are determined in accordance with the anatomy of the patient to be imaged.

BACKGROUND

Magnetic resonance imaging (MRI) is a non-invasive imaging technique widely used in medical diagnostics and research that generates high-resolution images without the use of ionizing radiation to visualize the internal structures and functions of the body. The quality of MRI images can be affected by various factors, such as patient motion, magnetic field inhomogeneities, gradient nonlinearity, and radiofrequency (RF) coil configurations. These factors can lead to image artifacts and spatial intensity variations, which might hinder accurate interpretation of the images.

To address these issues, researchers have developed various techniques to correct for intensity variations in MRI images. One such approach involves acquiring B1 field maps to estimate transmit and receive field distributions within the patient's body, which describes the strength of the B1 field. However, these techniques often require additional scan time and may not be compatible with all MRI systems or coil configurations.

To generate an MRI image within the body of a patient, a static magnetic field (B0) is first applied by an MRI scanner to align the nuclear spins of atoms. Next, while scanning, an RF transmitter generates RF pulses by causing perturbations to the local magnetic fields. Resulting RF signals emitted by the nuclear spins are detected by an RF receiver to form an image.

In clinical practice, to generate diagnostic images with higher spatial and contrast resolution the strength of B0 fields is higher (1.5 T to 3.0 T and up). However, with higher B0 fields, errors in the contrast of diagnostic images may appear because of non-uniform RF transmission. One factor for this is different dielectric properties of various tissues in the human body leading to non-uniform local perturbations to the B1 fields. As B0 increases, the distribution of the transmit B1 field becomes less uniform, leading to more noticeable signal intensity variation.

To mitigate this issue, a common approach is to map the B1 magnetic field and calibrate for the non-uniform transmit distribution and receive sensitivity of the transmit and receiver coils. A whole-body coil (WBC) is often used for the transmit coil and a phased array coil (PAC) is often used for the receiver coil. In a spatially resolved B1 map, each pixel is a measurement of the transmit magnetic field B1, and this map can be acquired as a pre-scan procedure and used for calibration, design, or correction of data in subsequent acquisitions during the protocol. Determining the transmit distribution of the WBC and receive sensitivities of both coils leads to a method for calculating accurate coil sensitivity maps for each element in the PAC, from which image signal intensity can be corrected. B1 field mapping is a well-established method for characterizing the B1 field and can involve acquiring a set of images and using them to calculate the B1 map.

Although there exist a number of B1 mapping approaches, a common downside is that the measurement time is impractically prolonged up to about 1 minute for reasonable resolution and field of view (FOV). Model-based methods, such as the Bloch model and geometric model approaches, include assumptions that may not be correct for all clinical situations, leading to potential inaccuracies. Therefore, it is desirable to address this and other deficiencies of current approaches.

SUMMARY

The present disclosure provides a method including acquiring spatially encoded B1 projection data of a patient using a magnetic resonance imaging system; and determining a first transmit map (Tx+) using only the acquired B1 projection data.

In one embodiment, the method further includes acquiring an image using the MRI system and correcting an image intensity of the acquired image using the determined first transmit map.

In another embodiment, the method further includes determining a corresponding estimated receive map (Tx−) based on the determined first transmit map (Tx+), by referencing pre-calculated corresponding estimated transmit and receive maps.

In another embodiment, the method comprises correcting the image intensity of the acquired image using both Tx+ and Tx− maps.

In another embodiment, the method comprises correcting the image intensity of the acquired image using only the Tx+ map.

In another embodiment, the method comprises determining the first transmit map using a predetermined lookup table associating B1 projections and corresponding transmit maps.

In another embodiment, the method comprises determining the first transmit map by applying the acquired B1 projection data to a trained machine-learning model.

In another embodiment, the method comprises determining the first transmit map via an electromagnetic simulation based on the acquired B1 projection data, wherein the B1 projection data is used to guide, correct, and/or shape an output of the electromagnetic simulation.

In another embodiment, the step of acquiring the B1 projection data further comprises determining, from patient information, an imaging anatomy, obtaining a number of projections and an orientation pattern for the determined imaging anatomy, and acquiring the B1 projection data based on the obtained number of projections and the orientation pattern. In one embodiment, the orientation pattern is represented by a set of polar and azimuthal axes in a three-dimensional volume.

In another embodiment, there is provided an apparatus, comprising processing circuitry configured to acquire spatially encoded B1 projection data of a patient using a magnetic resonance imaging system; and a first transmit map using only the acquired B1 projection data.

In another embodiment, there is provided a method including acquiring low-resolution B1 Cartesian map data of a patient using a magnetic resonance imaging system; and determining a transmit map using only the acquired low-resolution B1 Cartesian map data.

The method and apparatus offer a wide range of techniques and options for acquiring B1 projection data, determining transmit and receive B1 maps, and generating intensity-corrected images, making it comprehensive and efficient for addressing intensity inhomogeneities in MRI.

In one embodiment, the acquiring step includes acquiring the B1 projection data using a WBC and a PAC.

In another embodiment, the acquiring step further comprises acquiring the spatially encoded B1 projection data using a single two-dimensional slice within a volume along the obtained orientation pattern of the B1 projection data.

In another embodiment, In another embodiment, the acquiring step further comprises acquiring the spatially encoded B1 projection data using a two-dimensional bar selection within a volume along the obtained orientation pattern of the B1 projection data.

In another embodiment, the acquiring step includes acquiring the B1 projection data using a spatial-encoding technique.

BRIEF DESCRIPTION OF THE DRAWINGS

Various embodiments of this disclosure that are proposed as examples will be described in detail with reference to the following figures, wherein like numerals reference like elements, and wherein:

FIGS. 3(a)-(e) show a non-limiting example of different B1 projections and projection data acquired along the projections respectively and the associated transmit and receive maps determined using a dictionary search, according to one embodiment of the present disclosure;

FIGS. 4(a)-(e) show a non-limiting example of different B1 projections and projection data acquired along the projections respectively and the associated transmit and receive maps determined using a machine learning network, according to one embodiment of the present disclosure;

DETAILED DESCRIPTION

The present disclosure relates to a method for acquiring and using magnetic resonance imaging (MRI) data for the purpose of generating B1 field maps that are used to correct for the effects of non-uniform RF fields in MRI images. Specifically, the disclosure relates to a method for acquiring B1 projections using MRI pulse sequences and determining B1 projection data, and the subsequent calculations and use of these projections to generate B1 field maps used for image correction.

MRI is a non-invasive medical imaging technique that produces high-resolution images of the human body. In MRI, a strong magnetic field is applied to the patient, which causes the hydrogen atoms in the body to align with the magnetic field. RF pulses are then applied to the patient, which excite the hydrogen atoms and cause them to emit a signal, which is detected by the MRI system and the data is processed to create an image of the patient.

One of the challenges in MRI is correcting for variations in the B1 field, which can cause variations in image signal intensity. Non-uniform B1 fields in MRI images can lead to significant errors in signal intensity and image contrast. These errors can result in incorrect diagnoses and the need for repeat imaging studies, increasing healthcare costs and patient discomfort. Therefore, it is useful to correct for these errors by characterizing the B1 field, which describes the strength of the B1 field.

Figure 1B:
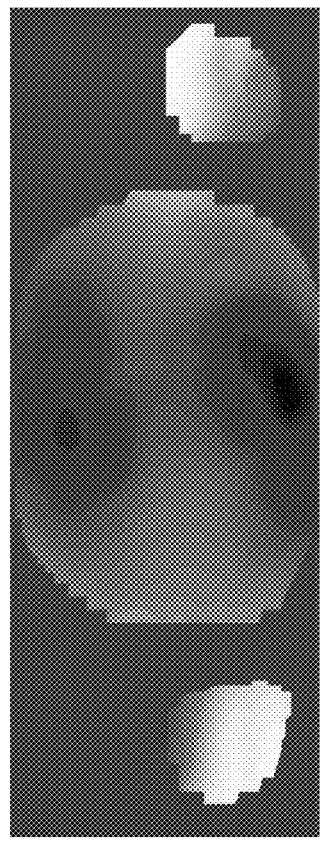
FIGS. 1(a) and 1(b) show exemplary B1 field maps acquired in two different imaging anatomies, i.e. abdomen and head.
Figure 1A:
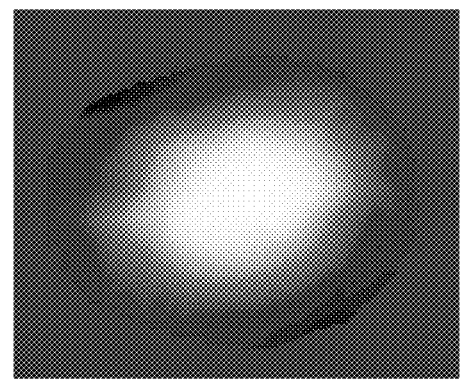

FIGS. 1(a) and 1(b) show exemplary B1 field maps acquired for two different imaging anatomies, i.e., an abdomen and a head. Each of the B1 maps illustrated in FIGS. 1(a) and 1(b) has a characteristic distribution, which corresponds to a +/- pattern caused by dielectric effects. Individual patient maps fit similar characteristic patterns, differing in aspect ratio, spatial scaling, scaling of B1 nonuniformity, etc.

One challenge in B1 field mapping is time required to acquire data needed for the calculation of the B1 map. Traditionally, such data are acquired using dedicated B1 mapping sequences. However, these are often time-consuming and might not be available for all MRI scanners and coil configurations.

To overcome these challenges, the present disclosure proposes a method for estimating B1 maps in a fast and efficient manner. The method involves acquiring a series of one-dimensional projections or low-resolution Cartesian maps using an MRI pulse sequence, followed by referencing pre-calculated B1 maps specific to each anatomy of interest. The method also involves appropriately selecting a number of projections and orientations of the projections to maximize the information content and accuracy of the estimation of the B1 maps while simultaneously considering advantages of shorter scan times.

In one embodiment, the acquisition step includes acquiring the B1 projection data using a WBC and a PAC. Whole-body coils and phased array coils are commonly used in MRI systems to transmit and receive RF signals, respectively. The WBC generates a relatively homogenous RF transmit field, while the greater sensitivity of PAC receiver coils allows for improved signal-to-noise ratio (SNR).

While there is no method to directly measure the receive sensitivity of the WBC, there exist many methods to correct for the non-uniform transmit distribution of the WBC and the receive sensitivity of the PAC. Most methods require the acquisition of a three-dimensional B1 map as a pre-scan image, for example, with 6-8 two dimensional slices to cover the imaging volume. This may be time-consuming, with each slice having an acquisition time of 5-10 seconds for a reasonable resolution and field of view (FOV). Model-based methods have the potential to yield inaccurate results as they include assumptions that might not be correct for all clinical situations, by attempting to solve for two unknowns with insufficient data resulting in an indeterminate solution [See: J. Wang, M. Qiu, Q. X. Yang, M. B. Smith, R. T. Constable, Measurement and correction of transmitter and receiver induced nonuniformities in vivo, Magnetic Resonance in Medicine. 53 (2005) 408-417; J. Wang, M. Qiu, In vivo method for correcting transmit/receive nonuniformities with phased array coils, Magnetic Resonance in Medicine. 53 (2005) 666-674, incorporated herein by reference in their entirety]. Reciprocity methods measure and compute complex conjugates of the WBC transmit maps to solve for the PAC receive maps, however with introduced error as this is not the exact relationship between B1 transmit and B1 receive [See: W. M. Brink, M. J. Versluis, J. M. Peeters, P. Bornert, A. G. Webb, Passive radiofrequency shimming in the thighs at 3 Tesla using high permittivity materials and body coil receive uniformity correction, Magnetic Resonance in Medicine. 76 (2016) 1951-1956; H. Watanabe, N. Takaya, F. Mitsumori, Non-uniformity correction of human brain imaging at high field by RF field mapping of B1+ and B1−, Journal of Magnetic Resonance. 212 (2011) 426-430, incorporated herein by reference in its entirety].

In one embodiment of the present disclosure, the general process involves acquiring a PAC image P(tx+,rx,C) and a WBC image W (tx+,tx−,C). Here, rx refers to the PAC coil receive sensitivity field, tx+ is the B1 transmit field, C is the image contrast and structure derived from Bloch equations, and tx− is the WBC receive sensitivity field. Typically, a receive sensitivity map S is created for each channel in the PAC by normalizing the PAC image of each channel with the WBC image. In this way, the calculation of S removes the influence of tx+ and C. However, the S maps contain the residual receive sensitivity pattern of WBC (tx−) in the final calculated S data.

At low B0 fields (1.5 T and lower), the WBC receive sensitivity pattern (tx−) is mostly uniform, hence the influence of tx− in S is a minor problem. At high magnetic field strengths (3.0 T and up), however, the WBC receive sensitivity pattern (tx−) decreases in uniformity and the influence of tx− in the receive sensitivity maps S can be more noticeable. One method for determining how this affects the quality of the data is to calculate accurate receive sensitivity maps for each coil element of the PAC. From the transmit distribution maps of the WBC and the receive sensitivity maps of the PAC, accurate intensity corrections of the image can be calculated.

The present disclosure aims to obtain estimated 3D volume maps of Tx+ and Tx− for the WBC, for example. The approach seeks to use Tx− maps for the calculation of accurate 3D volume maps of S, which represent coil sensitivity maps for each element in the receiver array. A simple model can be applied to solve for Tx−, where Tx−=WBC (tx+, tx−, C)/model (tx+, C). This model incorporates the Tx+ map and uses the simple Bloch equation model to solve for C, as parameter maps, i.e., T1, T2, and M0 are not available, and hence the traditional Bloch equation cannot be solved. To minimize the influence of C, the sequence parameters of the WBC and PAC image acquisitions can be designed to generate WBC and PAC images with very low contrast. The goal is to achieve intensity correction of the image with the use of Tx+ only or Tx+ and Tx−.

In one embodiment, the acquisition step includes acquiring the B1 projection data using a spatial encoding technique. Spatial encoding techniques are used to encode spatial information in the MRI signal. By acquiring B1 projection data with a spatial encoding technique, the method estimates the B1 transmit and receive maps with higher accuracy and reduced scan times compared to conventional methods.

In another embodiment, the spatial encoding technique is a two-dimensional bar selection using a spin-echo within a volume of the patient along the obtained orientation pattern of the B1 projection data. This approach can provide efficient and accurate acquisition of the B1 projection data for estimating the transmit and receive maps.

In another embodiment, the spatial encoding technique is a single two-dimensional slice using a slice-selective gradient and a specific RF pulse within a volume of the patient along the determined orientation of the B1 projection data. This data can be acquired using either a field echo or spin echo. This configuration embodies a different acquisition of the B1 projection data for estimating the transmit and receive maps.

Once the transmit maps have been determined, they can be used to optimize various aspects of the MRI acquisition. For example, the transmit maps can be used to optimize RF pulse design, which is useful for achieving uniform excitation across the imaging volume. By using the transmit maps to design RF pulses that compensate for spatially varying B1 sensitivity, it is possible to achieve more uniform excitation across the imaging volume, which in turn leads to improved image quality.

In addition to optimizing RF pulse design, the transmit maps can also be used to optimize the choice of imaging parameters, such as flip angle and repetition time. By analyzing the transmit maps, it is possible to identify regions of the imaging volume that may be subject to B1 field inhomogeneity and adjust the imaging parameters accordingly to ensure that the resulting images have sufficient SNR and contrast.

In yet another embodiment, the acquiring step includes correcting the image intensity using the set of transmit maps and the set of receive maps to generate an intensity-corrected image. This correction step can be performed in a post-processing stage. By applying the estimated transmit (Tx+) and receiver coil maps(S), the method effectively corrects for spatial intensity variations in the acquired image, resulting in a more accurate and reliable representation of the patient's anatomy.

The number of dimensions and orientations chosen for the B1 projections depends on the complexity of the anatomy being imaged and the desired level of accuracy. In general, a higher number of dimensions and orientations provides a more accurate measure of the B1 field but requires a longer acquisition time.

In some embodiments, the step of acquiring the B1 projection data can further include determining, from the patient information, an imaging anatomy, and obtaining a number of projections and an orientation pattern of the B1 projection data for the imaging anatomy. The step of acquiring the image of the patient can further include generating gradient signals based on the obtained number of projections and an orientation pattern of the B1 projection data and applying the generated gradient signals to gradient coil drivers of the magnetic resonance imaging system.

Figure 2:
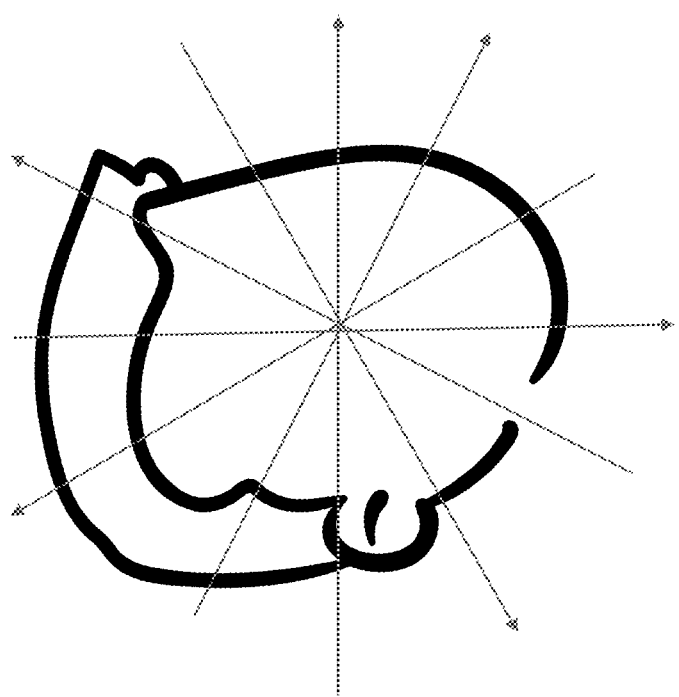
FIG. 2 shows a non-limiting example of an imaging anatomy of a human head with 9 B1 projections and an orientation pattern of a set of polar and azimuthal axes separated by 45°, according to one embodiment of the present disclosure.

FIG. 2 shows a non-limiting example of an imaging anatomy of a human head with 9 B1 projections and an orientation pattern of a set of polar and azimuthal axes separated by 45°, according to one embodiment of the present disclosure. This number of projections and orientation pattern can provide adequate coverage of the head and allow for accurate estimation of the transmit and receive maps for intensity correction.

The orientation of the projections also can be specific for each imaging anatomy. The orientation can be chosen to align with the characteristic B1 pattern of the anatomy. For example, 2 orthogonal projections, oriented at about 45° can be chosen for the head. For the abdomen, 2 orthogonal projections or 4 projections separated by about 45° can be chosen. Both breasts and thighs can use one horizontal projection due to their simple B1 patterns. Note that the specific angles are not restrictive. Other angular orientations are possible within the present disclosure. For example, an angle of 40°, 60°, etc., can be used instead of 45° as shown in FIG. 2.

Once the low-resolution images are acquired, they are used to reference pre-calculated B1 maps specific to the anatomy of interest. In a further embodiment, the determining step includes determining a set of transmit maps and a set of receive maps by referencing pre-calculated electromagnetic simulations of WBC transmit maps (Tx+) and receive maps (Tx−). These maps may be obtained from a database of pre-calculated maps or referenced on-the-fly during the MRI examination [See: Y. Lai, X. Zhao, W. Zhang, S. J. Garnier, L. Nie, P. Lu, H. Wang; GE Precision Healthcare LLC, Method and apparatus for correcting uniformity of a magnetic resonance image. U.S. Pat. No. 10,718,839B2 (2020), incorporated herein by reference in its entirety]. By referencing these pre-calculated maps, the method efficiently estimates the transmit (Tx+) and receive maps(S) for intensity correction, without the need for additional time-consuming measurements or computations.

In one embodiment, the determining step further includes determining the set of transmit maps and the set of receive maps using a dictionary search method. The dictionary search method involves searching a pre-defined dictionary or lookup table of WBC transmit maps (e.g., Tx+) and/or receive maps (Tx−) stored in association with one or more B1 projections to find the best match for the acquired B1 projection data. This approach provides a fast and efficient way to estimate the transmit and receive maps for intensity correction. There exist many methods to perform a dictionary search, however the details of these methods are immaterial to the present disclosure.

FIGS. 3(a)-(e) show a non-limiting example of different B1 projections and projection data acquired along the projections respectively, and the associated WBC transmit (Tx+) and WBC receive maps (Tx−) determined using a dictionary search, according to one embodiment of the present disclosure. FIG. 3(a) shows two independent B1 projections and orientations and FIG. 3(b) shows the B1 projection data acquired. A representation of a dictionary search method is shown in FIG. 3(c) and the best matching transmit map in FIG. 3(d) is determined based on the estimated transmit maps. FIG. 3(e) shows the corresponding receive map for the transmit map in FIG. 3(d).

In another embodiment, the determining step further includes determining the set of WBC transmit maps (Tx+) and the set of WBC receive maps (Tx−) using a machine-learning network. Machine-learning techniques, such as deep learning or artificial neural networks, can be employed to learn the relationship between the acquired B1 projection data and the corresponding transmit and receive maps. By training the machine-learning network on a large dataset of B1 projection data and corresponding transmit and receive maps, the method can accurately estimate the maps for intensity correction.

FIGS. 4(a)-(e) show a non-limiting example of different B1 projections and projection data acquired along the projections respectively, and the associated transmit and receive maps determined using a machine-learning network, according to one embodiment of the present disclosure. FIG. 4(a) shows two independent B1 projections and orientations and FIG. 4(b) shows the B1 projection data acquired. A representation of a machine-learning network is shown in FIG. 4(c), and the best matching transmit map is shown in FIG. 4(d) is determined based on the estimated transmit maps. FIG. 4(e) shows the corresponding receive map for the transmit map in FIG. 4(d).

In another embodiment, the determining step includes using the B1 projection data to guide, correct, or shape a simulation. The simulation is the basis for the set of WBC transmit maps (Tx+) and the set of WBC receive maps (Tx−). By incorporating the acquired B1 projection data into the simulation, the method can achieve flexible estimates of the transmit and receive maps for intensity correction.

In a preferred embodiment, the acquiring step includes acquiring the B1 projection data in 1 to 2 seconds, for example. This short acquisition time reduces the overall scan time for the patient and improves the efficiency of the MRI examination.

In addition to the above embodiments, the method also provides several alternative techniques for acquiring the B1 projection data. These techniques are numerous, e.g. the Bloch-Siegert Shift method, the Double Angle method, the Actual Flip Angle method, the Dual Refocusing Echo Acquisition Mode method, the Phase Sensitive method, and the Saturation Recovery method. However, each of these methods has its own limitations and challenges. With a range of techniques, the method accommodates different imaging scenarios and preferences.

In another embodiment, the disclosure provides a method for determining an intensity-corrected magnetic resonance image including acquiring B1 transmit low-resolution Cartesian map data of a patient using a MRI system, determining a set of estimated high-resolution Tx+ maps using only the acquired B1 transmit low-resolution Cartesian map data, acquiring an image of the patient using the MRI system based on the determined set of estimated Tx+ maps, and outputting the acquired image of the patient.

In a further embodiment, the acquired B1 transmit Cartesian map data is a 3D Cartesian map that is lower resolution than the output estimated 3D Tx+ map. In another further embodiment, the acquired B1 transmit Cartesian map data is a low-resolution 2D Cartesian map. These low-resolution Cartesian maps provide a detailed representation of the B1 field within the imaging volume, allowing for highly accurate estimations of the Tx+ and Tx− maps for intensity correction. In a further embodiment, the B1 transmit low-resolution Cartesian map data is acquired in less time than that required for the full resolution 3D Cartesian B1 map, for example in 30 to 60 seconds, as opposed to one to two minutes or more for the full resolution 3D map. This acquisition time can balance the need for accurate B1 field estimation with the overall efficiency of the MRI examination.

Figure 5:
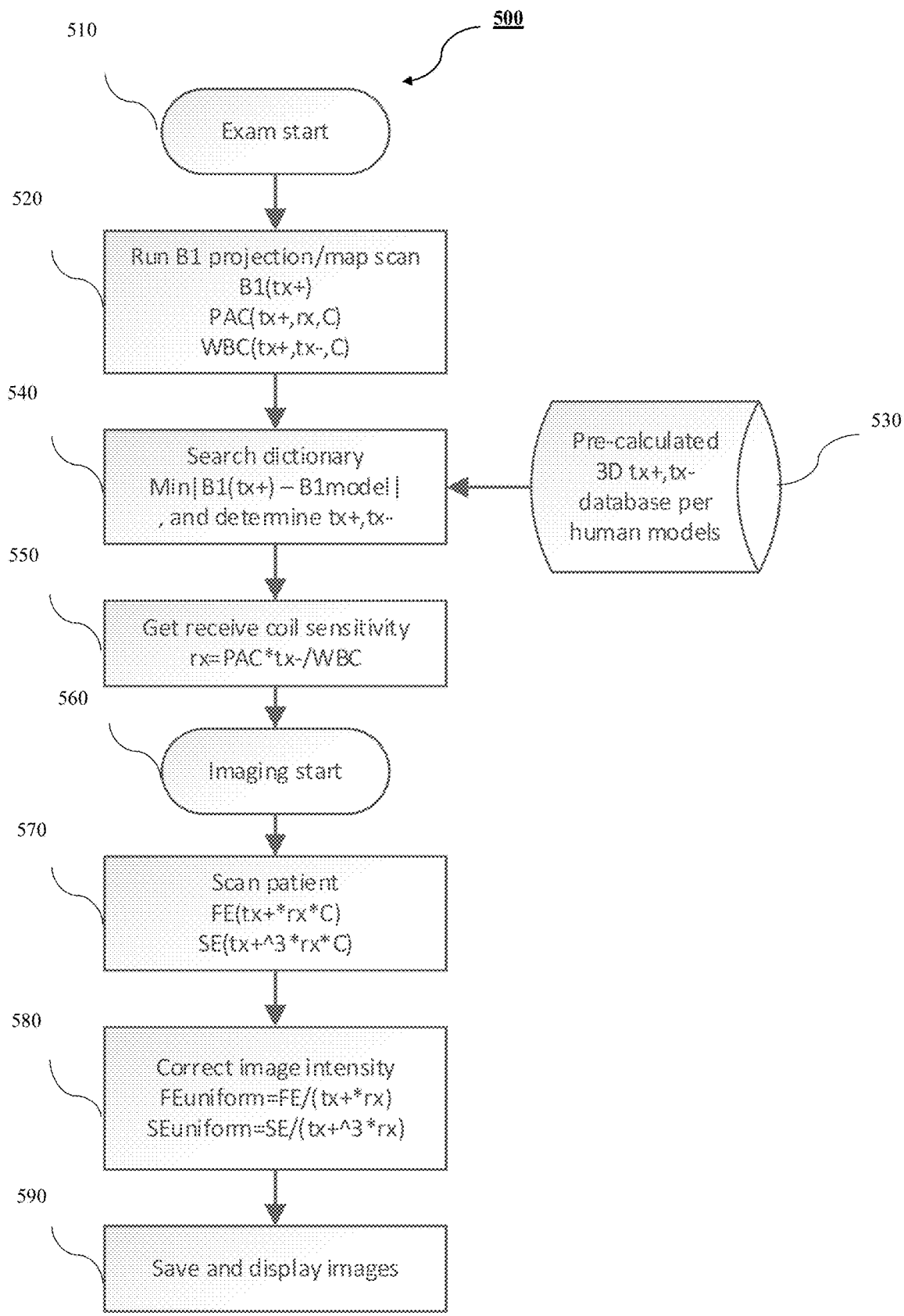
FIG. 5 shows a non-limiting example of a flow chart of a process for determining an intensity-corrected magnetic resonance image using a dictionary search and referencing pre-calculated ratios of transmit maps to receive maps corresponding with the set of estimated transmit maps, according to one embodiment of the present disclosure.

FIG. 5 shows a non-limiting example of a flow chart of a process for determining an intensity-corrected magnetic resonance image using a dictionary search and referencing pre-calculated transmit maps and receive maps, according to one embodiment of the present disclosure. The method 500 for determining an intensity-corrected magnetic resonance image preferably includes in step 510, starting an imaging exam, and in step 520, running a B1 projection scan preferably with a whole-body coil and phased array coil.

In step 540, B1 projection data from step 520 and pre-calculated 3D transmit and receive maps from a database 530 of human models are used in a dictionary search method to determine a set of transmit maps and the set of receive maps.

In step 550, the receive coil sensitivity is obtained using the set of transmit maps and the set of receive maps.

In step 560, the imaging exam is started.

In step 570, the patient is scanned.

In step 580, the image intensity is corrected using the set of transmit maps and the set of receive maps.

In step 590, the corresponding magnetic resonance images are saved and displayed.

The present disclosure also includes an apparatus for determining an intensity-corrected magnetic resonance image. The apparatus comprises processing circuitry configured to acquire B1 projection data, determine a set of estimated transmit maps using the acquired B1 projection data, acquire an image of the patient using the MRI system based on the determined set of estimated transmit maps, and output the acquired image of the patient. This apparatus allows for the efficient implementation of the method and the production of high-quality, intensity-corrected MRI images.

Figure 6:
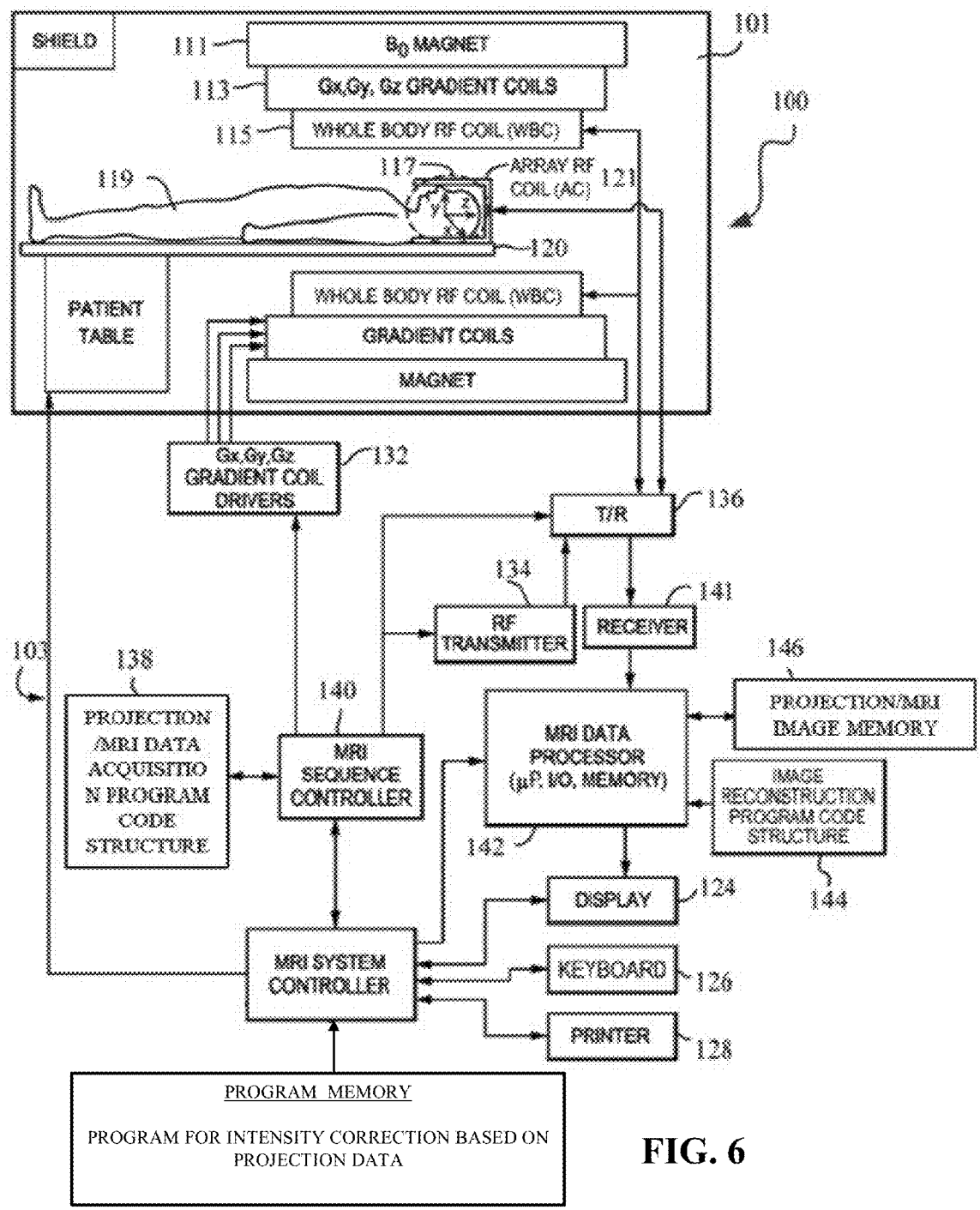
FIG. 6 is a schematic block diagram of a magnetic resonance imaging system, according to one embodiment of the present disclosure.

FIG. 6 depicts a non-limiting example of a magnetic resonance imaging (MRI) system 100 for such an apparatus. The MRI system 100 includes a gantry 101 shown in a schematic cross-section and various related system components 103 it interfaces with. Typically, at least the gantry 101 is located within a shielded room. The MRI system geometry includes a substantially coaxial cylindrical arrangement of the B0 static field magnet 111, a Gx, Gy, and Gz gradient coil set 113, and a large whole-body RF coil (WBC) assembly 115. Along a horizontal axis inside this cylindrical array of elements is an imaging volume 117 shown substantially encompassing the head of a patient 119 that is supported by a patient table 120.

One or more smaller array RF coils 121 can be more closely coupled to the patient's head (referred to, for example, as "scanned object" or "object") in imaging volume 117. As those in the art can appreciate, compared to the WBC (whole-body coil), relatively small coils and/or arrays, such as surface coils or the like, are often customized for different geometries of body parts (e.g., arms, shoulders, elbows, wrists, knees, legs, chest, spine, etc.). Such smaller RF coils are referred to as array coils (AC) or phased-array coils (PAC). These arrays can include at least one coil configured to transmit RF signals into the imaging volume, and a plurality of receiver coils configured to receive RF signals from an object, such as the patient's head, in the imaging volume.

The MRI system 100 further includes an MRI system controller 130 that has input/output ports connected to a display 124, a keyboard 126, and a printer 128. As those in the art can appreciate, the display 124 can be a touchscreen to enter control inputs as well, in addition to a mouse or other I/O device(s).

The MRI system controller 130 interfaces with an MRI sequence controller 140, which controls the Gx, Gy, and Gz gradient coil drivers 132, as well as the RF transmitter 134, and the transmit/receive switch 136 (if the same RF coil is used to transmit and receive signals). The RF transmitter 134 may be comprised of two or more transmitter channels for driving two or more RF transmit coils or ports on coils. The MRI sequence controller 140 includes suitable program code structure 138 for implementing MRI imaging and, as it is also known as, nuclear magnetic resonance (NMR) imaging techniques. The MRI sequence controller 140 can facilitate one or more preparation scan (pre-scan) sequences, and a scan sequence to obtain a main scan magnetic resonance (MR) image, also referred to as a diagnostic image. MR data from pre-scans can be used, for example, in B1 projection scans.

The MRI system components 103 include an RF receiver 141 providing input to data processor 142 to at least create processed image data, which is sent to display 124. The MRI data processor 142 is also configured to access previously generated MR data, images, and/or projection data, including but not limited to, projection data acquired with different transmit channels and/or system configuration parameters 146, and program code structures 144 and 150.

In one embodiment, the MRI data processor 142 includes processing circuitry, including but not limited to devices such as an application-specific integrated circuit (ASIC), configurable logic devices (e.g., simple programmable logic devices (SPLDs), complex programmable logic devices (CPLDs), field programmable gate arrays (FPGAs), and other circuit components arranged to perform the functions recited in the present disclosure.

The processor 142 executes one or more sequences of one or more instructions contained in the program code structures 144 and 150. Alternatively, the instructions can be read from another computer-readable medium, such as a hard disk or a removable media drive. One or more processors in a multi-processing arrangement can also be employed to execute the sequences of instructions contained in the program code structures 144 and 150. In other embodiments, hard-wired circuitry can be used in place of or in combination with software instructions. Thus, the disclosed embodiments are not limited to any specific combination of hardware circuitry and software. For example, the program code structure 150 can store instructions that when executed perform method 500.

Additionally, the term "computer-readable medium" refers to any non-transitory medium that participates in providing instructions to the processor 142 for execution. A computer readable medium can have many forms, including but not limited to, non-volatile media or volatile media. Non-volatile media includes, for example, optical, magnetic disks, and magneto-optical disks, or a removable media drive. Volatile media includes but is not limited to dynamic memory.

FIG. 6 also includes a generalized depiction of an MRI system program storage (memory) 150, where stored program code structures such as instructions to perform method 500 are stored in non-transitory computer-readable storage media accessible to the various data processing components of the MRI system 100. As those in the art can appreciate, the program store 150 can be segmented and directly connected, at least in part, to different ones of the system 103 processing computers having most immediate need for such stored program code structures in their normal operation (i.e., rather than being commonly stored and connected directly to the MRI system controller 130).

The MRI system 100 depicted in FIG. 7 can also be utilized to practice exemplary embodiments such as those described below. The system components can be divided into different logical collections of "boxes" and typically comprise numerous digital signal processors (DSP), microprocessors and special purpose processing circuits (e.g., for fast A/D conversions, fast Fourier transforming, array processing, etc.). Each of those processors is typically a clocked "state machine" wherein the physical data processing circuits progress from one physical state to another upon the occurrence of each clock cycle (or predetermined number of clock cycles).

Furthermore, not only does the physical state of the processing circuits (e.g., CPUs, registers, buffers, arithmetic units, etc.) progressively change from one clock cycle to another over the course of operation, the physical state of associated data storage media (e.g., bit storage sites in magnetic storage media) is transformed from one state to another during operation of such a system. For example, at the conclusion of an image reconstruction process and/or an image reconstruction map (e.g., coil sensitivity map, unfolding map, ghosting map, a distortion map, etc.) generation process, an array of computer-readable accessible data value storage sites in physical storage media will be transformed from some prior state to a new state wherein the physical states at the physical sites of such an array vary between minimum and maximum values to represent real world physical events and conditions. As those in the art can appreciate, such arrays of stored data values represent and constitute a physical structure, as does a particular structure of computer control program codes that, when sequentially loaded into instruction registers and executed by one or more CPUs of the MRI system 100, causes a particular sequence of operational states to occur and be transitioned through within the MRI system 100.

As MRI technology continues to advance, the importance of addressing intensity inhomogeneities becomes increasingly evident. The proposed method and apparatus provide a comprehensive solution to this challenge, offering a wide range of techniques and options for acquiring B1 projection data, determining transmit and receive B1 maps, and generating intensity-corrected images.

Moreover, the present disclosure's adaptability to various imaging scenarios and preferences ensures that it remains relevant in the ever-evolving field of medical imaging. By improving the quality and speed of MRI scans and facilitating accurate diagnoses, the method and apparatus contribute to the advancement of healthcare and ultimately benefit patients.

As a person skilled in the art can recognize from the previous detailed description and from the figures and claims, modifications and changes can be made to the preferred embodiments of the disclosure without departing from the scope of this disclosure defined in the following claims.

What is claimed is:

1. A method, comprising:
    acquiring spatially encoded B1 projection data of a patient obtained by scanning using a magnetic resonance imaging (MRI) system; and
    determining a first transmit map for intensity correction by finding a transmit map that is a best match for the acquired B1 projection data, based on a correspondence relationship between different B1 projection data and corresponding transmit maps precalculated by electromagnetic simulation.

2. The method of claim 1, further comprising acquiring an image using the MRI system and correcting an image intensity of the acquired image using the determined first transmit map.

3. The method of claim 2, further comprising determining a corresponding estimated receive map (Tx−) based on the determined first transmit map (Tx+), by referencing precalculated corresponding estimated transmit and receive maps.

4. The method of claim 3, wherein the correcting step further comprises correcting the image intensity of the acquired image using both the Tx+ and Tx− maps.

5. The method of claim 3, wherein the correcting step further comprises correcting the image intensity of the acquired image using only the Tx+ map.

6. The method of claim 1, wherein the acquiring step comprises acquiring the B1 projection data using a whole-body coil and a phased-array coil.

7. The method of claim 1, wherein the acquiring step comprises acquiring the B1 projection data using a spatial-encoding technique.

8. The method of claim 1, wherein the determining step further comprises determining the first transmit map using a predetermined lookup table associating the different B1 projection data and the corresponding transmit maps.

9. The method of claim 1, wherein the determining step further comprises determining the first transmit map by applying the acquired B1 projection data to a trained machine-learning model.

10. The method of claim 1, wherein the determining step further comprises determining the first transmit map via the electromagnetic simulation based on the acquired B1 projection data, wherein the B1 projection data is used to guide, correct, and/or shape an output of the electromagnetic simulation.

11. The method of claim 1, wherein the step of acquiring the B1 projection data further comprises:
    determining, from patient information, an imaging anatomy,
    obtaining a number of projections and an orientation pattern for the determined imaging anatomy, and
    acquiring the B1 projection data based on the obtained number of projections and the orientation pattern.

12. The method of claim 11, wherein the orientation pattern is represented by a set of polar and azimuthal axes in a three-dimensional volume.

13. The method of claim 12, wherein the imaging anatomy is a human head, the number of projections is 9, and the orientation pattern is a set of polar and azimuthal axes separated by 45°.

14. The method of claim 11, wherein the acquiring step further comprises acquiring the spatially encoded B1 projection data using a two-dimensional bar selection within a volume along the obtained orientation pattern of the B1 projection data.

15. The method of claim 11, wherein the acquiring step further comprises acquiring the spatially encoded B1 projection data using a single two-dimensional slice within a volume along the obtained orientation pattern of the B1 projection data.

16. The method of claim 1, wherein the step of acquiring the B1 projection data further comprises acquiring the B1 projection data using a Bloch-Siegert Shift method, a Double Angle method, an Actual Flip Angle method, a Dual Refocusing Echo Acquisition Mode method, a Phase Sensitive method, or a Saturation Recovery method.

* * * * *